(12) United States Patent
McMillan et al.

(10) Patent No.: US 12,059,097 B2
(45) Date of Patent: Aug. 13, 2024

(54) COOKING CHAMBER MOISTURE CONTROL

(71) Applicant: Method Barbecue, LLC., The Colony, TX (US)

(72) Inventors: James McMillan, The Colony, TX (US); George T. Hazelton, Jr., Plano, TX (US); George Thomas Hazelton, III, Dallas, TX (US)

(73) Assignee: Method Barbecue, LLC., The Colony, TX (US)

( * ) Notice: Subject to any disclaimer, the term of this patent is extended or adjusted under 35 U.S.C. 154(b) by 0 days.

(21) Appl. No.: 17/810,419

(22) Filed: Jul. 1, 2022

(65) Prior Publication Data

US 2023/0000285 A1    Jan. 5, 2023

Related U.S. Application Data

(60) Provisional application No. 63/202,965, filed on Jul. 1, 2021.

(51) Int. Cl.

| | |
|---|---|
| *A47J 37/07* | (2006.01) |
| *A23L 5/10* | (2016.01) |
| *A47J 36/32* | (2006.01) |
| *B05B 9/04* | (2006.01) |

(52) U.S. Cl.
CPC ............ *A47J 37/0786* (2013.01); *A23L 5/15* (2016.08); *A47J 36/321* (2018.08); *A47J 37/0713* (2013.01); *B05B 9/0403* (2013.01); *A23V 2002/00* (2013.01)

(58) Field of Classification Search
CPC ......... A23L 5/13; A23L 5/15; A23V 2002/00; A47J 36/321; A47J 37/0704; A47J 37/0713; A47J 37/0786; B05B 1/20; B05B 12/02; B05B 15/58; B05B 9/0403; B05B 9/0423
USPC .......................................................... 99/536
See application file for complete search history.

(56) References Cited

U.S. PATENT DOCUMENTS

| | | | | |
|---|---|---|---|---|
| 4,906,485 | A | * 3/1990 | Kirchhoff | ................ A21B 5/00 126/369 |
| 2020/0329909 | A1 | * 10/2020 | Conrad | ..................... F24C 7/08 |

* cited by examiner

*Primary Examiner* — Dana Ross
*Assistant Examiner* — Joseph W Iskra
(74) *Attorney, Agent, or Firm* — Scheef & Stone, LLP; Keith C. Rawlins (57) ABSTRACT

A moisture control apparatus for a cooking chamber of a cooking device. A cooking system that can include the cooking device and the moisture control apparatus connected to the cooking chamber of the cooking device. The moisture control apparatus can include a control portion and a dispersal portion. The control portion can be located on the outside of the cooking device. The control portion can control the flow of water to the dispersal portion so as to control moisture on a food in the cooking chamber of the cooking device by providing, by the dispersal portion, a mist or fog of water particles to the cooking surface of the cooking chamber. The dispersal portion can be located inside the cooking chamber of the cooking device, and the control portion can be located outside the cooking chamber of the cooking device.

17 Claims, 8 Drawing Sheets

COOKING CHAMBER MOISTURE CONTROL

CROSS REFERENCE TO RELATED APPLICATIONS

This application is a non-provisional of and claims priority to U.S. Provisional Patent Application No. 63/202,965 filed on Jul. 1, 2021, which is incorporated by reference in its entirety.

FIELD OF THE DISCLOSURE

The present disclosure generally relates to food preparation, and more particularly to preparing meat in a cooking chamber.

BACKGROUND

Smoking and grilling are popular methods of preparing beef and other meats. For smoking, many backyard cooks prefer automated smokers, including those that feed wood pellets into a firebox to maintain a more consistent temperature, typically 225° F. throughout the cooking, depending on the selected meat and desired outcome. However, this constant temperature can leave the meat dried out. Other smokers require constant attention which can be tiresome and tedious over the sometimes-full day worth of cooking the meat undergoes.

SUMMARY

Disclosed is a moisture control apparatus that can be attached to a cooking device to provide moisture while cooking food (e.g., meat). The moisture control apparatus can include a dispersal portion and optionally a control portion that is fluidly coupled to the dispersal portion. The dispersal portion can be attached to a wall of the cooking chamber of the cooking device. The dispersal portion can be positioned inside the cooking chamber, and the control portion can be positioned outside the cooking chamber. The moisture control apparatus can be included in a cooking system that additionally includes the cooking device.

Also disclosed is a method that includes actuating one or more control valves of the moisture control apparatus to allow or disallow a flow of water or a mixture containing water to into the cooking chamber of the cooking device through at least one misting or fogging nozzle in the dispersal portion of the moisture control apparatus.

Also disclosed are methods for retrofitting a cooking device with a moisture control apparatus. In some aspects, the retrofitting method can include cutting a hole in a wall of a cooking chamber of the cooking device; and attaching the moisture control apparatus to the wall of the cooking chamber. In additional or alternative aspects, the retrofitting method can include cutting a hole in a wall of a cooking chamber of the cooking device; and assembling the moisture control apparatus via the hole.

Other technical features can be readily apparent to one skilled in the art from the following figures, description, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The term "cooking device" as used herein can refer to a smoker, a pellet grill, a propane grill, or any other type of grill that is configured to cook food in a cooking chamber.

The term "cooking chamber" as used herein can refer to a space in a cooking device into which food is placed to be cooked under heat, for example, onto a wire rack (e.g., a cooking surface 160). The cooking chamber can include a lid or door which can be opened and closed.

The term "conduit" as used herein can refer to piping or tubing used to connect portions of the moisture control apparatus.

The term "water source" as used herein includes municipal or well water obtained via faucet, hose, water pipe, water filter, or combinations thereof.

The term "mobile device" as used herein refers to a mobile phone (e.g., smartphone), a tablet, a laptop, a smart watch, or other computer device that can be configured to run an application thereon for the communications and/or control described herein.

Disclosed is a moisture control apparatus that can be attached to a cooking device to provide moisture while cooking food (e.g., meat). The moisture control apparatus can include a dispersal portion and optionally a control portion that is fluidly coupled to the dispersal portion. The dispersal portion can be attached to a wall of the cooking chamber of the cooking device. The dispersal portion can be positioned inside the cooking chamber, and the control portion can be positioned outside the cooking chamber. A control system that includes cooking device and the moisture control apparatus coupled to the cooking device is also disclosed. Moreover, methods that can be performed by the apparatus and system are also disclosed. Moreover, methods for retrofitting a cooking device with the moisture control apparatus are also disclosed.

The control portion can be configured to receive or contain a liquid (e.g., water or mixture containing water), and to actuate one or more valves in the moisture control apparatus between open and closed positions. The control portion can have a controller operably connected to each of the valve(s). The controller can be embodied as a button that can be manually pressed to pneumatically or mechanically actuate a valve between an open position and a closed position, e.g., with a button that the user pushes to turn the flow of water through the moisture control apparatus on and off; alternatively, the controller can be embodied as a microcontroller (MCU) operably connected to each of the valve(s) and configured to actuate each of the valves between an open position and a closed position at setpoint time intervals; alternatively, the controller can be embodied as a mobile device and wireless signal receiver configured to communicate (e.g., via wireless signal sent from the mobile device to be received by user input into the mobile device) with one another so as to program (e.g., via a programmed schedule) the receiver to actuate each of the valve(s) between an open position and a closed position. In some embodiments, the controller can include a timer configured to cause the controller to actuate each of the valves between the open position and the closed position at specified time intervals or can automatically determine an appropriate duty cycle sequence for the application of water. In aspects where the controller is synchronized with the mobile device and receiver, the mobile device and/or the wireless receiver can each include a networking component that can connect the mobile device and the receive to send control signals from the mobile device to the receiver via a wireless communication network such as Bluetooth Special Interest Group (Bluetooth SIG) (Bluetooth), IEEE 802.11 (Wi-Fi), IEEE 802.15 (Personal Area Networks), or Near-Field Communication (NFC). The mobile device can be configured to run an application program that is configured to communicate with the receiver of the moisture control apparatus, and is able to monitor the temperature, dew point, relative humidity, other moisture parameters, or combinations thereof outside the cooking chamber of the cooking device. The application program can be also configured to communicate to the user the time remaining on the cook, and can allow the user to re-program operating parameters of the moisture control apparatus.

The dispersal portion of the moisture control apparatus can be configured to provide a mist or fog of water particles to a cooking surface of the cooking chamber of the cooking device. The dispersal portion is coupled to a wall of the cooking chamber and is coupled to the control portion via a conduit (e.g., conduit for flow of liquid from the control portion into the dispersal portion). The dispersal portion can include at least a first conduit and an elbow connector. The first conduit can have an end coupled to the control portion and configured to receive water from the control portion. One end of the elbow connector can be attached to the opposite end of the first conduit. A misting or fogging nozzle can be attached to the other end of the elbow connector and can be positioned such that an outlet of the nozzle opens to the cooking surface of the cooking chamber.

The misting or fogging nozzle can have a conical dispersal pattern so as to disperse water over the entirety of the food (e.g., meat). If the cooking chamber of the cooking device is larger, additional conduits and tee connectors can be used to provide additional misting or fogging nozzles to adequately disperse water over the food. If additional connectors and conduits are used, the first conduit can be attached to a tee connector. An additional conduit can be attached to the opening located 180° from the opening connected to the first conduit. Tee connectors and additional conduits can be included as necessary, with the final conduit being attached to the elbow connector. Each connector can have a misting or fogging nozzle attached thereto and can be positioned such that an outlet of each nozzle opens to the cooking surface of the cooking chamber. Embodiments of the present disclosure state that there should be at least 6" between each nozzle so as to not oversaturate the meat with water.

Embodiments of the present disclosure can provide a method that includes actuating a control valve so as to allow or disallow a flow of water into a cooking chamber of a cooking device. The control valve can be located outside the cooking chamber, while the at least one nozzle can be located inside the chamber. The method can be performed using any embodiment of the moisture control apparatus disclosed herein. Different embodiments of the method can provide for the actuation step to be performed manually by pushing a button on the control valve or by pushing a button on a user interface that can be provided by an app on a mobile device. Other embodiments of the disclosure my also provide for the actuation step to be performed automatically via an app on a mobile device. If the actuation step is performed through an app on a mobile device, that mobile device can be wirelessly connected to the control valve. The mobile device can be wirelessly connected to the control valve through Bluetooth, Wi-Fi, NFC, or any other wireless connection.

Embodiments of the present disclosure can provide a method for retrofitting a cooking device with an embodiment of the moisture control apparatus. The method for retrofitting can include cutting a hole in the wall of the cooking chamber of the cooking device, extending the dispersal portion of the moisture control device through the hole, and attaching the moisture control apparatus to the wall and/or another wall of the cooking chamber. In some embodiments, the moisture control apparatus can be assembled via the hole. For example, the dispersal portion can be placed inside the cooking chamber such that a longitudinal axis of the dispersal portion runs through a center of the hole in the wall, and the control portion can be placed outside of the cooking chamber such that a center of the conduit of the control portion that connects with the dispersal portion is aligned with the center of the hole in the wall. The dispersal portion and the control portion can then be connected to one another, and then the moisture control apparatus can be attached to the wall and/or another wall of the cooking chamber of the cooking device as described herein.

Figure 1:
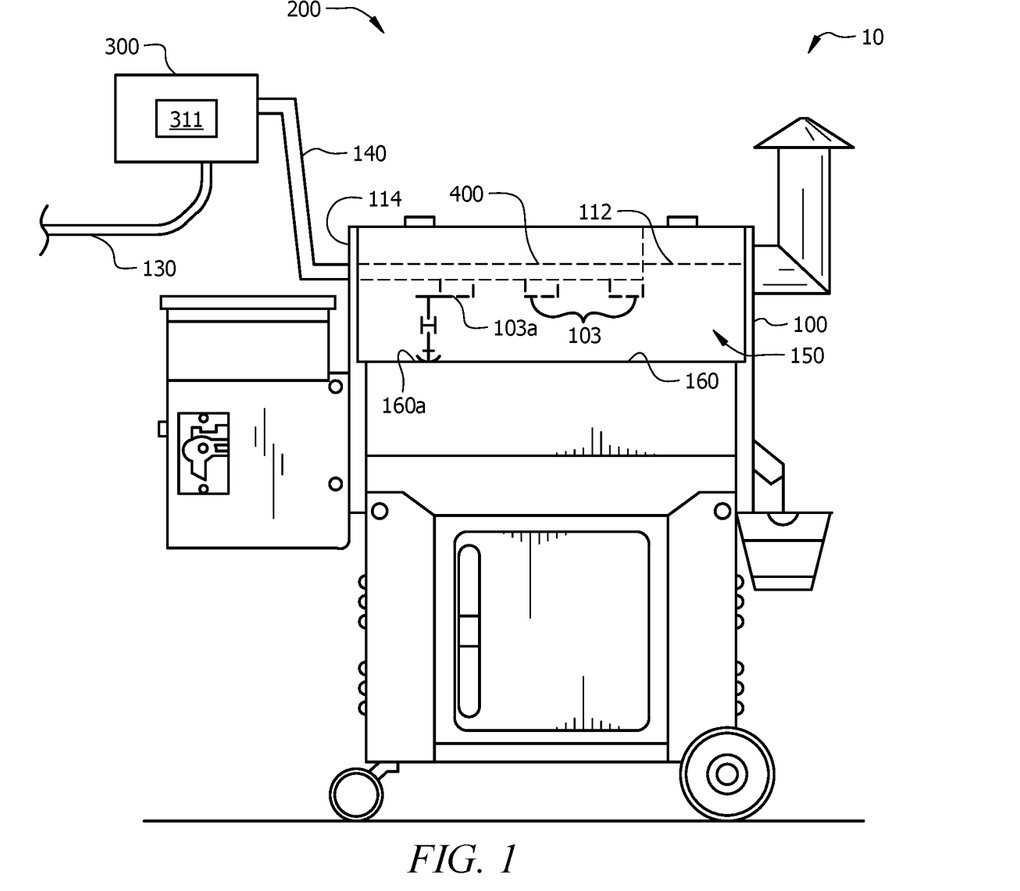
FIG. 1 depicts a side elevational view of a cooking system with a moisture control apparatus according to the disclosure.

FIG. 1 depicts a side elevational view of cooking system 10 with moisture control apparatus 200 according to the disclosure. Cooking system 10 can include moisture control apparatus 200 and cooking device 100. The moisture control apparatus 200 can have a control portion 300 and a dispersal portion 400. The control portion 300 can be attached to an outside surface of the cooking device 100. The dispersal portion 400 can be attached to a wall of the cooking device 100, in the cooking chamber 150 of the cooking device 100.

The control portion 300 can be connected to a water source 130 to provide water to the moisture control apparatus 200. The control portion 300 can be coupled to the dispersal portion 400 with a conduit 140.

The dispersal portion 400 can include at least one misting or fogging nozzle 103. The misting or fogging nozzles 103 can be a liquid atomizing nozzle. In one embodiment of the present disclosure the misting or fogging nozzles 103 can have a conical spray pattern. The water pressure entering the misting or fogging nozzles 103 can be about 40 psig. The nozzles 103 can have an aperture of 8.6 inches. In embodiments, each misting or fogging nozzle 103 can be configured to generate a conical misting pattern; however, it is contemplated that the misting pattern can have other shapes such as cylindrical or trapezoidal. In embodiments having more than one misting or fogging nozzle 103, the misting pattern of each of the nozzles 103 can overlap with a misting pattern of another nozzle 103 to make sure that no portion of the contents of the of the cooking chamber 150 is missed. A bottom 103a of the misting or fogging nozzle 103 can be a height H above a top surface 160a of the cooking surface 160. In aspects, the height H can be a range of about 4 to 15 inches; alternatively, in a range of about 6 to about 15 inches; alternatively, about 6, 7, 8, 9, 10, 11, 12, 13, 14, or 15 inches.

The moisture control apparatus 200 can include stabilizing strut 112 connected to a wall or ceiling of the cooking chamber 150 and to the dispersal portion 400. Depending on the shape and design of cooking chamber 150, the stabilizing strut 112 can extend horizontally from the dispersal portion 400 of the moisture control apparatus 200 to an opposing side wall of the cooking chamber 150 or can extend vertically from the dispersal portion 400 of the moisture control apparatus 200 to a top wall (e.g., ceiling) of the cooking chamber 150. In aspects, more than one stabilizing struts 112 can be used to maintain the dispersal portion 400 in a desired orientation (e.g., such that the bottom 103a of the nozzles 103 are all the same height H above the top surface 160a of the cooking surface 160). In embodiments of the disclosure where the cooking device 100 is a smoker, moisture control apparatus 200 can be positioned on an outside surface of a wall of cooking chamber 150 opposite a smoke valve of the smoker to reduce or prevent smoke from entering the system 10 during operation.

Figure 2:
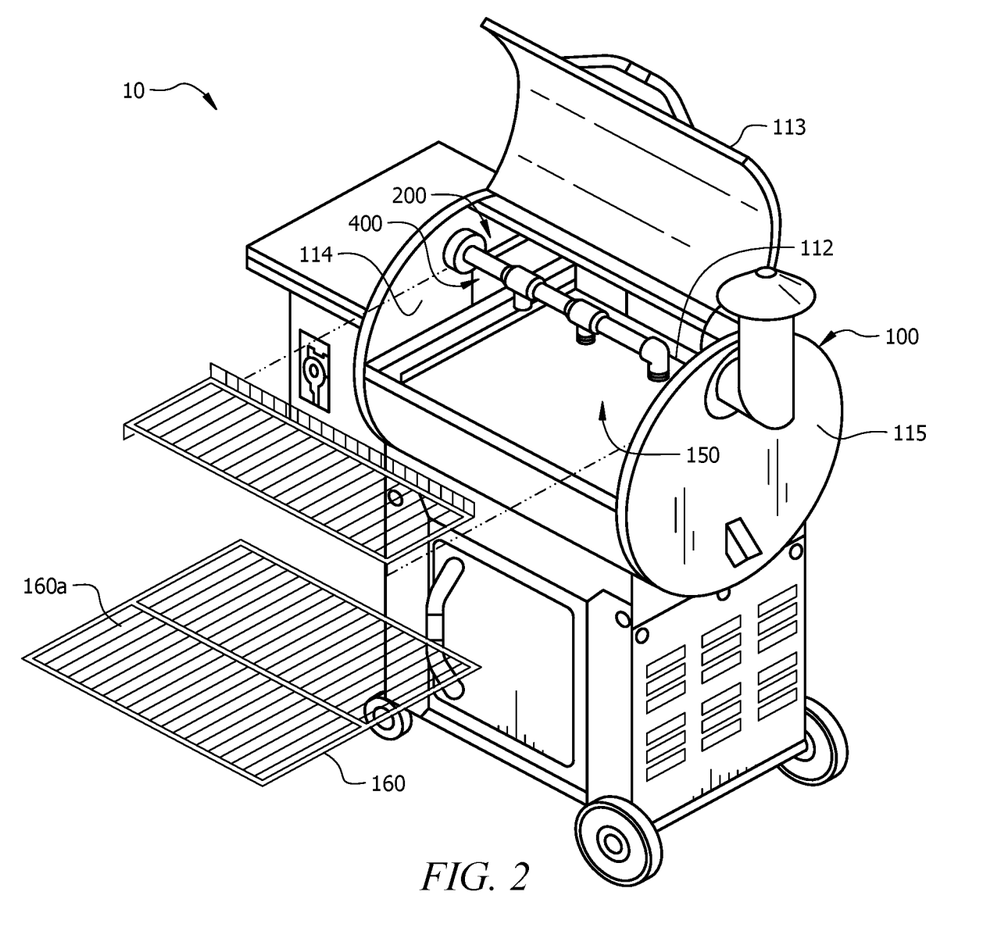
FIG. 2 depicts a perspective view of the cooking system.
Figure 3A:
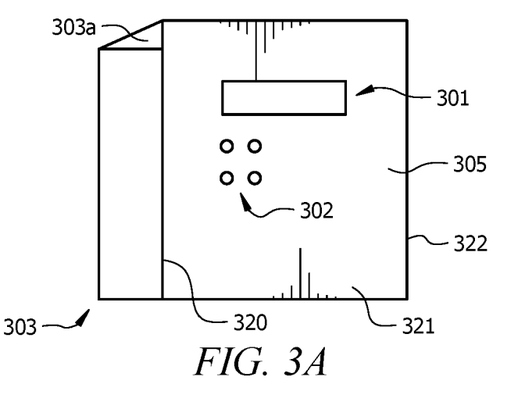
FIGS. 3A to 3D depict side elevational views of a control portion of the moisture control apparatus.
Figure 3B:
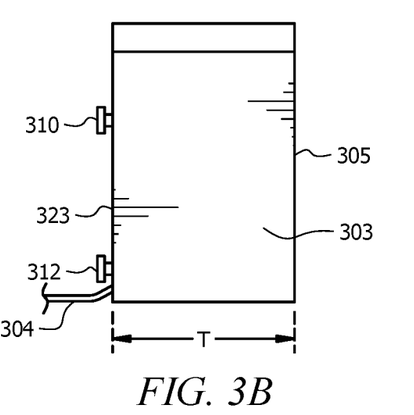
Figure 3C:
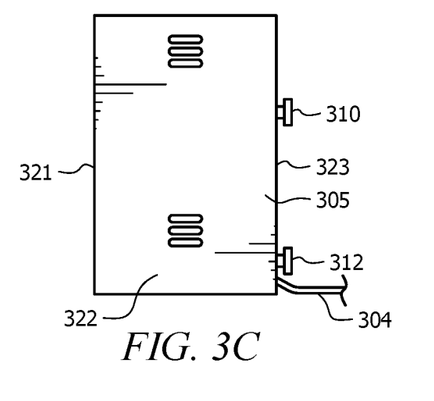
Figure 3D:
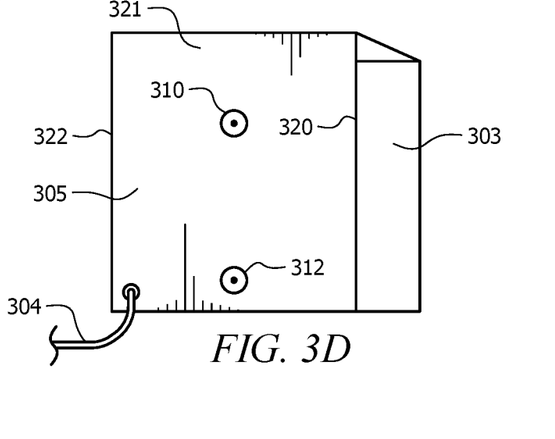

FIG. 2 depicts cooking system 10 having a lid 113 of the cooking device 100 open so as to view the dispersal portion 400 of the moisture control apparatus 200 within the cooking chamber 150. The dispersal portion 400 can be seen coupled to a side wall 114 of the cooking chamber 150 of the cooking device 100. The dispersal portion 400 of the moisture control apparatus 200 can extend horizontally from the side wall 114 of the cooking chamber 150 and can be in a range of about 6 to about 15 inches above a cooking surface 160 in the cooking chamber 150. The distance above the cooking surface 160 is configured to avoid water washing seasoning off of the food and to avoid evaporation of water before water reaches the food. As seen in FIG. 2, the stabilizing strut 112 can extend horizontally from an opposite side wall 115 of the cooking chamber 150. Additionally or alternatively, stabilizing strut 112 can extend vertically from a top surface of cooking chamber 150.

FIGS. 3A-3D depict side elevational views of an embodiment of the control portion 300 of the moisture control apparatus 200. The control portion 300 can have a housing 305. The housing 305 can have any shape, such as a shape of a rectangular prism (e.g., a box) having interior space in which components of the control portion 300 are contained.

The control portion 300 can optionally include a liquid reservoir 303 connected to a side 320 of the housing 305. The reservoir 303 is configured to hold a volume of liquid, such as water or a mixture containing water and additives (e.g., seasonings for food that are contained in the water). The embodiment of the control portion 300 depicted in FIGS. 3A-3D has a display screen 301 and control buttons 302 on a front side 321 of the control portion 300. Other embodiments of the control portion 300 can have a larger display screen 301 that can be a touch screen. The liquid reservoir 303 can have the same thickness T as the housing 305. A side 322 of the housing 305 that is opposite the side 320 can have air vents formed therein that allow heat to escape the housing 305. A back side 323 of the housing 305 can have an inlet connector 312 and an outlet connector 310. The back side 323 of the housing 305 can also include an inlet for a power cord 304 to provide power to the control portion 300. The reservoir 303 can include a lid 303a configured to cover the top of the reservoir 303. The lid 303a can be removed to add liquid to the reservoir 303, to stir liquid in the reservoir 303, or for any other purpose.

Figure 4A:
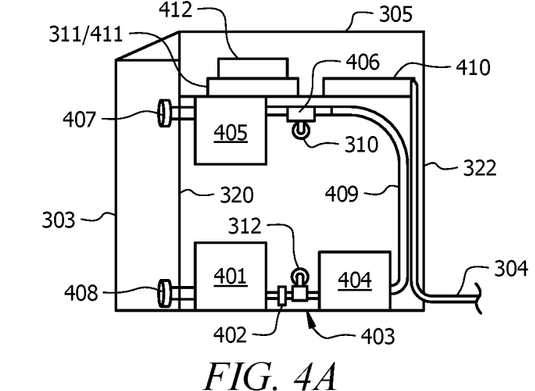
FIGS. 4A and 4B depict front cutaway views of the control portion of the moisture control apparatus.
Figure 4B:
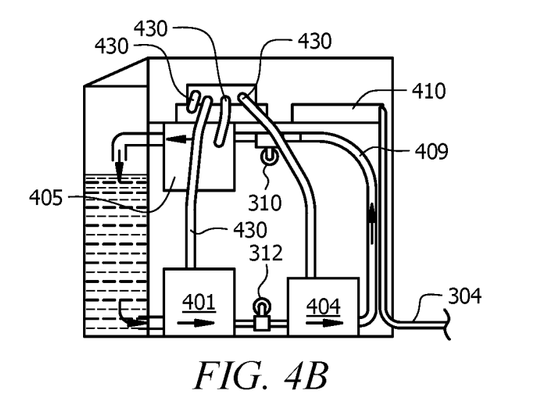

FIG. 4A and FIG. 4B depict front cutaway views of the control portion 300 of the moisture control apparatus 200. The front side 321 of the housing 305 is removed to view the interior of the housing 305 and the components of the control portion 300 that are contained therein. A lower portion of the liquid reservoir 303 can be fluidly connected to a pump 401 by a conduit 408. A conduit can then fluidly connect the pump 401 to a first check valve 402. The first check valve 402 can be fluidly connected (e.g., directly or via a conduit) to an inlet tee connector 403. The opposite side of the inlet tee connector 403 can be connected to a conduit that is also connected to a first solenoid valve 404. The third side of the inlet tee connector 403 can have a conduit that leads to the inlet connector 312. The first solenoid valve 404 can have a conduit 409 connecting the first solenoid valve 404 to an outlet tee connector 406. The opposite side of the outlet tee connector 406 can be connected to a second solenoid valve 405 via a conduit. The third side of the outlet tee connector 406 can be connected by a conduit to the outlet connector 310. The second solenoid valve 405 can have a water return 407 (e.g., a conduit or spout) fluidly connected to a top portion of the liquid reservoir 303.

FIGS. 4A and 4B also depict the electrical components of an embodiment of the control portion 300 of the cooking system 10. Electrical wiring is collective shown as wires 430. As described above, a power cord 304 can enter the control portion 300 from a back side of the housing 305. The power cord 304 can be connected to a power bank or power source 410 inside the housing 305. The power bank or power source 410 can be embodied as one or more batteries (e.g., alkaline or lithium ion battery(ies)), an AC/DC converter (e.g., to convert alternating current from an electrical outlet to direct current), a low voltage converter (e.g., to reduce voltage from a power source from 120V to a low voltage for the electronics used in the apparatus 200), or combinations thereof. The power bank or power source 410 can be connected by one of the electrical wires 430 to a controller 311. In the embodiment depicted in FIGS. 4A and 4B the controller 311 can be a microcontroller 411. The microcontroller 411 can be programmed to actuate the valves 404 and 405 between open and close positions, and to turn the pump 401 on and off. The microcontroller 411 can be connected with one or more of electrical wires 430 to the display screen 301 and the buttons 302 on the front side 321 of the housing 305 of the control portion 300. The microcontroller 411 can additionally or alternatively have wireless capabilities to connect to wireless networks for communication with a mobile device as described herein. The microcontroller 411 can receive instructions for operating the pump 401 and valves 404 and 405 from the display screen 301, buttons 302, a mobile device over the wireless network, or combinations thereof. The microcontroller 411 can also be connected with one or more of electrical wires 430 to a relay 412. The relay 412 can be connected by electrical wires 430 to the first solenoid valve 404, the second solenoid valve 405, and the pump 401. The relay 412 can transmit an electrical signal to the first solenoid valve 404, the second solenoid valve 405, the pump 401, or combinations thereof, via the respective electrical wires that connect the relay 412 to the first solenoid valve 404, the second solenoid valve 405, the pump 401. The signal sent to the first solenoid valve 404 and the second solenoid valve 405 can actuate the valves 404 and 405 from an open position to a closed position or vice versa. In aspects, the first solenoid valve 404 can be actuated to an open position and the second solenoid valve 405 can be actuated to a closed position; alternatively, the first solenoid valve 404 can be actuated to a closed position and the second solenoid valve 405 can be actuated to an open position; alternatively, the first solenoid valve 404 can be actuated to an open position and the second solenoid valve 405 can be actuated to an open position; alternatively, the first solenoid valve 404 can be actuated to a closed position and the second solenoid valve 405 can be actuated to a closed position. The signal sent to the pump 401 can turn the pump 401 on or off. The pump 401 can be turned on when the first solenoid valve 404 is actuated to an open position and the second solenoid valve 405 is actuated to a closed position; alternatively, the pump 401 can be turned on when the first solenoid valve 404 is actuated to a closed position and the second solenoid valve 405 is actuated to an open position; alternatively, the pump can be turned on when the first solenoid valve 404 is actuated to a closed position and the second solenoid valve 405 is actuated to a closed position; alternatively, the pump 401 can be turned on when the first solenoid valve 404 can be actuated to an open position and the second solenoid valve 405 is actuated to an open position. The pump 401 can be turned off when the first solenoid valve 404 is actuated to an open position and the second solenoid valve 405 is actuated to a closed position; alternatively, the pump 401 can be turned off when the first solenoid valve 404 is actuated to a closed position and the second solenoid valve 405 is actuated to an open position; alternatively, the pump can be turned off when the first solenoid valve 404 is actuated to a closed position and the second solenoid valve 405 is actuated to a closed position; alternatively, the pump 401 can be turned off when the first solenoid valve 404 can be actuated to an open position and the second solenoid valve 405 is actuated to an open position.

Water or a mixture containing water can be provided to the moisture control apparatus 200 through an external water source attached to the inlet connector 312, through filling the liquid reservoir 303, or both. A mixture containing water in the liquid reservoir 303 can include seasonings or other additives desired to be spread over the meat during the cooking process. Alternatively, the mixture in the liquid reservoir 303 can include an additive concentrate of seasoning (e.g., seasoning concentrated in a liquid form) that can be mixed with water received via inlet connector 312 to form the mixture containing water that is used to moisturize food in the cooking chamber 150 of the cooking device 100.

Figure 4C:
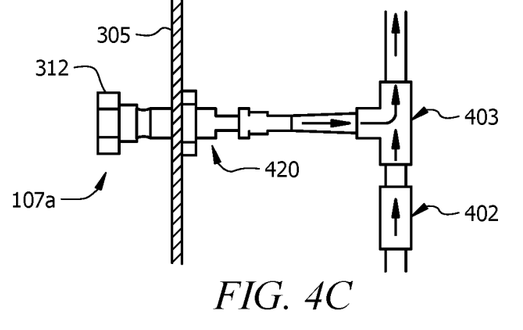
FIG. 4C depicts an isolated view of the inlet connector of the control portion.

FIG. 4C depicts an isolated view of the inlet connector 312 of the control portion 300. A straight adapter 107a can be included in the inlet connector 312 outside of the housing 305 of the control portion 300. The straight adapter 107a can be configured to connect to common water sources such as a garden hose. The straight adapter 107a can extend through the back side 323 of the housing 305 of the control portion 300 and connect to a second check valve 420 that can control the flow of water from the water source into the control portion 300. A conduit can connect the check valve 420 to the tee connector 403. The first check valve 402 can prevent the incoming water from flowing back into the pump 401 and liquid reservoir 303. The second check valve 420 can prevent liquid from the reservoir 303 that is pumped by pump 401 to the first solenoid valve 404 from flowing out of the inlet connector 312. With this check valve arrangement, the water flowing into the inlet connector 312 can flow towards the first solenoid valve 404 without flowing back to the pump 401. When the first solenoid valve 404 is open, the water can continue through the conduit 409 to the outlet tee connector 406.

Figure 4D:
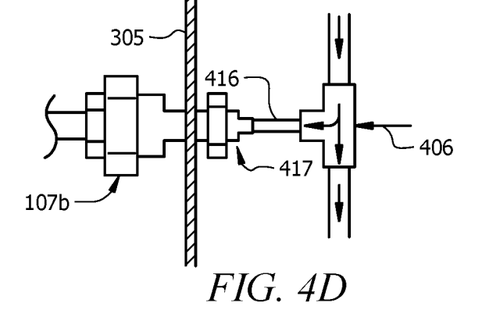
FIG. 4D depicts an isolated view of the outlet connector of the control portion.

The outlet tee connector 406 and the outlet connector 310 are depicted in FIG. 4D. Water or a mixture containing water can flow through outlet tee connector 406 and through the outlet connector 310, through outlet tee connector 406 and through the second solenoid valve 405, or through the outlet tee connector 406 and through both the outlet connector 310 and the second solenoid valve 405. When the second solenoid valve 405 is in a closed position, the water or mixture containing water flows only through the outlet connector 310. The outlet tee connector 406 can have a conduit 416 connected to a fitting 417 that can then be connected to a straight adapter 107b that is fluidly connected to the dispersal portion 400 of the moisture control apparatus 200.

The microcontroller 411 can receive a signal from the mobile device or input from the display screen 301 and buttons 302 to spray the food in the cooking chamber 150 with water or a mixture containing water. In embodiments where water was placed in the liquid reservoir 303, the microcontroller 411 can send a signal to the pump 401 to begin pumping water. The pump 401 can suction water into conduit 408 and can pump the water to the first solenoid valve 404. The microcontroller 411 can also send a signal to the first solenoid valve 404 to transition from a closed position to an open position. The water can then pass through the first solenoid valve 404, through the conduit 409, and to the outlet tee connector 406. Depending on the amount of water or mixture to be used on the food, the microcontroller 411 can be configured to not send a signal to the second solenoid valve 405 so that the valve 405 remains in a closed position, routing all of the water or mixture into the outlet connector 310 and to the dispersal portion 400 of the moisture control apparatus 200. When less water is desired, or the user wants to circulate water or the mixture in the reservoir 303, the microcontroller 411 can send a signal to the second solenoid valve 405 to actuate from the closed position to the open position. When the second solenoid valve 405 is in the open position, the water or mixture will split at the outlet tee connector 406, with a first portion flowing to the outlet connector 310 and a second portion flowing through the second solenoid valve 405, through the water return 407 and back into the liquid reservoir 303.

When the water or mixture has been spread across the food in the cooking chamber 150, the microcontroller 411 can send a signal to stop the flow of water to the dispersal portion 400. The microcontroller 411 can send a signal through electrical wires 430 to the pump 401 to stop supplying water from the liquid reservoir 303. The microcontroller 411 can also send a signal through the electrical wires 430 to the first solenoid valve 404 and the second solenoid valve 405 to transition from the open position to the closed position.

In embodiments where the water is coming from an external water source, the water can enter through the inlet connector 312 to the inlet tee connector 403. The microcontroller 411 can send a signal to the first solenoid valve 404 to transition from a closed position to an open position. The water can then pass through the first solenoid valve 404, through the conduit 409, and to the outlet tee connector 406. Depending on the amount of water or mixture to be used on the food, the second solenoid valve 405 can remain closed, routing all of the water into the outlet connector 310 and the dispersal portion 400 of the moisture control apparatus 200. When less water is desired, or the user wants to circulate the mixture, the microcontroller 411 can send a signal to the second solenoid valve 405 to transition from the closed position to the open position. When the second solenoid valve 405 is open the water or mixture will split at the outlet tee connector 406, with a portion traveling to the outlet connector 310 and a portion going through the second solenoid valve 405, through the water return 407 and back into the liquid reservoir 303.

When the water or mixture has been spread across the food in the cooking chamber 150, the microcontroller 411 can send a signal to stop the flow of water to the dispersal portion 400. The microcontroller 411 can send a signal through the electrical wires 430 to the first solenoid valve 404 to transition to a closed position. If the second solenoid valve 405 was also in the open position, the microcontroller 411 can send a signal through the electrical wires 430 to the second solenoid valve to transition to a closed position.

Other embodiments can have water, a mixture of seasoning and water, or a concentrate of seasoning in liquid form contained in the liquid reservoir 303, and water being supplied from an external water source (e.g., via a garden house connected to the inlet connector 312). These embodiments follow the same process as supplying water from the liquid reservoir 303.

Figure 5A:
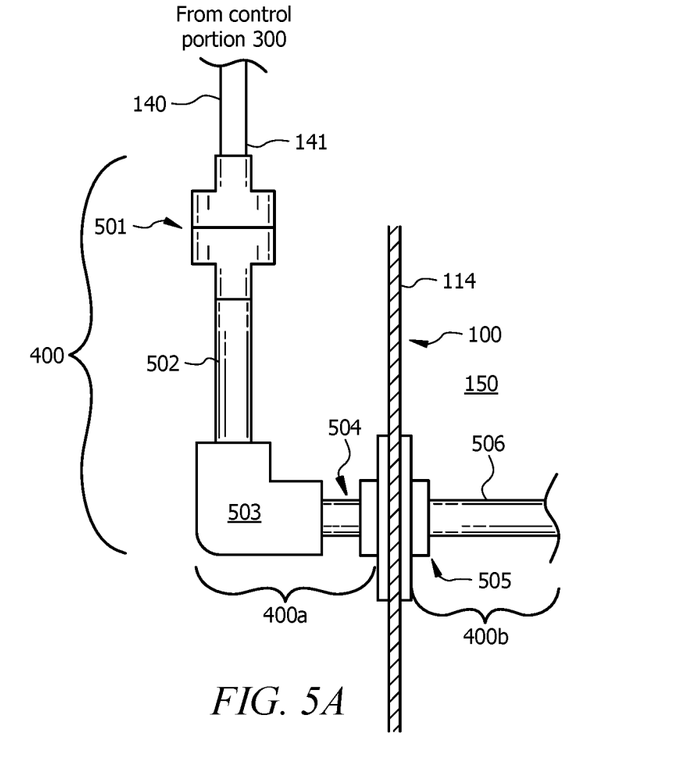
FIG. 5A depicts a schematic view of a connection between the control portion and the dispersal portion of the moisture control apparatus.

FIG. 5A depicts a schematic view of a connection between the control portion 300 and the dispersal portion 400 of the moisture control apparatus 200. Different embodiments of the connection can be provided based on the configuration of the cooking device 100 and the distance from the cooking chamber 150 to which the control portion 300 is coupled or connected. A conduit 140 can have an end connected to the outlet tee connector 406 and extend through the outlet connector 310 of the control portion 300 (e.g., see outlet tee connector 406 and outlet connector 310 in FIGS. 3A-3D and 4. The opposite end 141 of the conduit 140 can be connected to the dispersal portion 400. More particularly, the opposite end 141 of the conduit 140 can be connected to a straight connector 501 of the dispersal portion 400. The dispersal portion 400 can also include a conduit 502, an elbow connector 503, a conduit 504, a wall connector 505, and conduit 506, connected as shown in FIG. 5A. The wall connector 505 connects the outside portion 400a of the dispersal portion 400 with the inside portion 400b of the dispersal portion 400. The outside portion 400a includes connectors 501 and 503, part of connector 505, and conduits 502 and 504, and the outside portion 400a is positioned outside of cooking chamber 150 of the cooking device 100. The inside portion 400b includes part of connector 505 and conduit 506, and the inside portion 400b is positioned inside the cooking chamber 150 of the cooking device 100. The dispersal portion 400 is connected to the side wall 114 of the cooking device 100 via the wall connector 505.

Figure 5B:
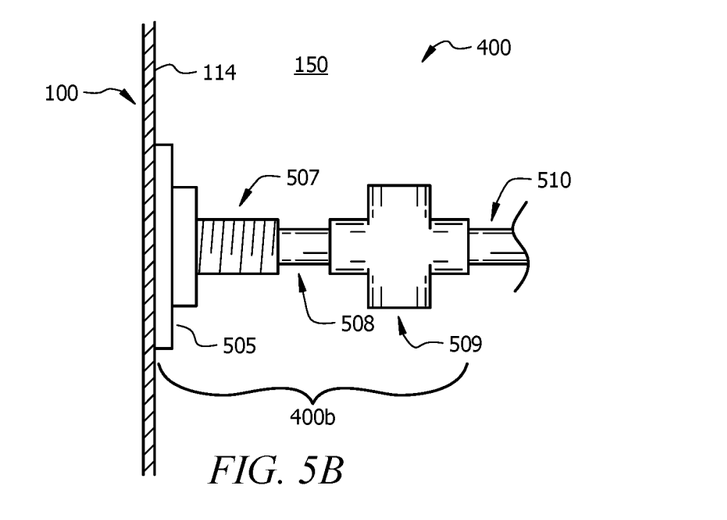
FIG. 5B depicts a schematic view of the portion of the dispersal portion that is inside the cooking chamber of a cooking device.

FIG. 5B depicts a schematic view of the portion 400b of the dispersal portion 400 that is inside the cooking chamber 150 of a cooking device 100. The inside portion 400b can include the wall connector 505, a threaded connector 507, a conduit 508, a straight connector 509, and a conduit 510 connected as shown in FIG. 5B. The wall connector 505 can be connected to the side wall 114 of the cooking device 100.

Figure 6A:
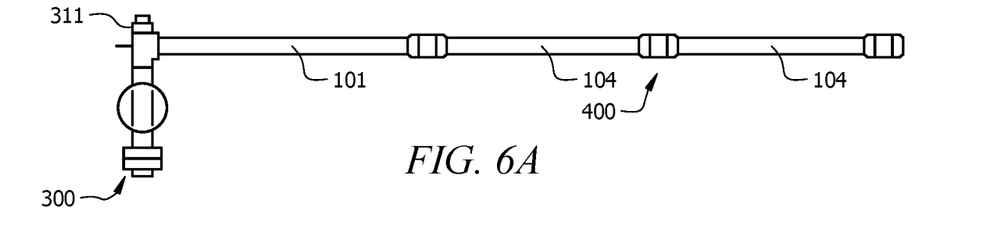
FIG. 6A depicts a top-down view of another embodiment of the moisture control apparatus according.

FIG. 6A depicts a top-down view of another embodiments of a moisture control apparatus 200. Moisture control apparatus 200 has a control portion 300 and a dispersal portion 400. The dispersal portion includes a first conduit 101 connected to the control portion 300. The first conduit 101 can connect to either a tee connector 106 or an elbow connector 102. In an embodiment with more than one misting or fogging nozzle 103, the first conduit 101 can be attached to a tee connector 106 which can then be attached to an additional conduit 104 which can then also be attached to either a tee connector 106 or an elbow connector 102. There can be as many additional conduits 104 as necessary to provide water to the entirety of the cooking surface 160. In an embodiment of the present disclosure the first conduit 101 and additional conduit 104 can be ⅛" pipe. If the cooking chamber 150 of the cooking device 100 is especially large, one or more of the tee connectors 106 can be replaced with another type of connector (e.g., a cross connector having connections for two nozzles) to increase the sprayable area of the misting or fogging nozzles 103 in a cooking chamber 150. If a cross connector is used, additional stabilizing struts (e.g., described herein as strut 112) can be used to secure moisture control apparatus 200 to the cooking device 100. Other embodiments can have more than one dispersal portion 400 (e.g., two spray manifolds connected in parallel or in a cross formation) connected to the control portion 300 for larger cooking chambers 150.

Figure 6B:
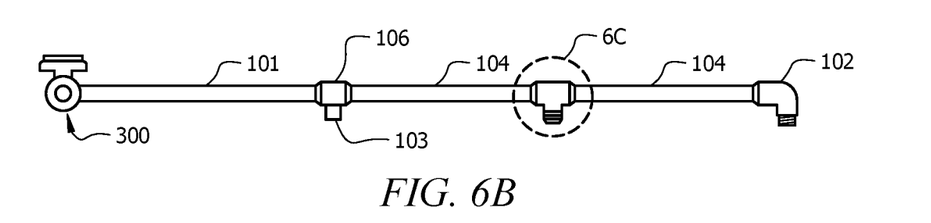
FIG. 6B depicts a side view of the moisture control apparatus of FIG. 6A according to the disclosure.

FIG. 6B depicts a side view of the moisture control apparatus 200 of FIG. 6A according to the disclosure. The first conduit 101 can extend horizontally from the control portion 300. In one embodiment of the disclosure the first conduit 101 can be about 10" long. The first conduit 101 can be attached to the tee connector 106 or the elbow connector 102. The tee connector 106 and the elbow connector 102 can each have a misting or fogging nozzle 103 attached to one outlet. The tee connector 106 and the elbow connector 102 can be positioned such that the misting or fogging nozzle 103 sits at a 90° angle to the first conduit 101 and can face downwards towards the cooking surface 160.

Figure 6C:
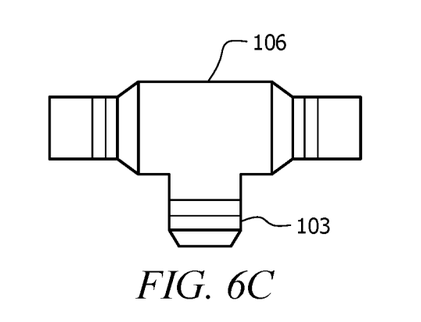
FIG. 6C depicts a side view of a connector and nozzle of cut away 6C of the moisture control apparatus of FIG. 6B according to the disclosure.

FIG. 6C depicts a cut-away of the tee connector 106 and the nozzle 103 of the moisture control apparatus 200 of FIG. 6A according to the disclosure. The tee connector 106 can have three openings, that can all be female connection points. Two of the openings line up to allow water to pass directly through the tee connector 106. The third opening is positioned at a 90° degree angle. The misting or fogging nozzle 103 can be attached to the third opening. The first conduit 101 or the additional conduit 104 can be attached to the first or second opening in the tee connector 106.

Figure 6D:
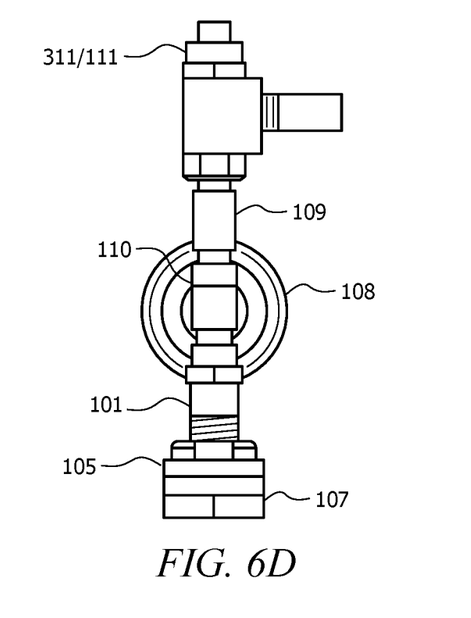
FIG. 6D depicts an end view of an embodiment of the control portion of the moisture control apparatus of FIG. 6A, where the controller is a button that manually actuate a valve.

FIG. 6D depicts a cut-away of an embodiment of the control portion 300 of the moisture control apparatus 200 of FIG. 6A according to the disclosure. The bottom of the figure depicts a straight adapter 107 that can be connected to a water source. Embodiments of the disclosure contemplate that the water source can be a common hose, a liquid reservoir system, a solenoid water valve, or other source of water. Straight adapter 107 can be connected to a straight reducer 105 which can aid in transitioning the size of the piping down to the radius of the first conduit 101 and the additional conduit 104. The straight reducer 105 can be connected to a right-angle tee connector 110. The right-angle tee connector 110 can have at least one male connection point, and at least one female connection point. The right-angle tee connector 110 can have a pressure gauge 108 connected to the opening at the right-angle. The pressure gauge 108 can be located outside of the cooking chamber 150 so the pressure in the moisture control apparatus 200 can be monitored through the entire cooking process. In embodiments where the control portion 300 has a digital display, the pressure gauge 108 can be located inside a housing (e.g., housing 305 in FIGS. 3A to 3D) of the control portion 300, and the pressure can be shown on the display screen 301. The right-angle tee connector 110 can be connected to a straight connector 109. The straight connector 109 can then be connected to a controller 311. In one embodiment of the disclosure, the controller 311 can be a controller 111 with a compact on/off control valve with compact push button. In other embodiments the controller 311 can have an electronic system with a program that sets the timing of actuating the control valve between the open and closed positions. The control valve can be automatically triggered at pre-set time intervals or can be set to disperse water if the cooking chamber 150 reaches a certain temperature. The controller 111 can then be coupled to the first conduit 101. In one embodiment of the disclosure, the controller 111 can connect to the first conduit at a 90° angle to the straight connector 109. All of the control portion 300 can be located outside of the cooking chamber 150 of cooking device 100.

Figure 6E:
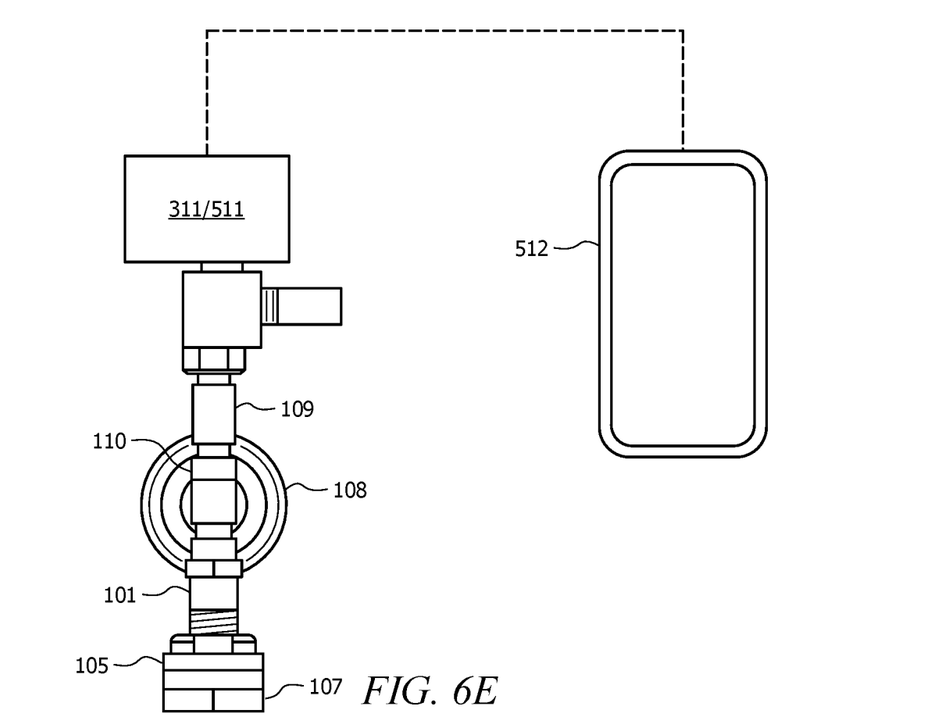
FIG. 6E depicts an end view of an embodiment of the control portion of the moisture control apparatus, where the controller is mobile device and receiver that actuate a valve.

FIG. 6E depicts another embodiment of the controller 311, wherein the controller 311 can be a mobile device 512. The mobile device 512 can communicate with a wireless receiver 511 on the control portion 300 of the moisture control apparatus 200. The wireless receiver 511 can be connected to the compact on/off valve. The mobile device 512 can send a signal to actuate the valve to the wireless receiver 511. The wireless receiver 511 can then send a signal through electrical wires 430 to the valve to transition to an open position from a closed position or a closed position from an open position allowing the mobile device 512 to control the flow of water to the dispersal portion 400 of the moisture control apparatus. The mobile device 512 can have an application that connects to the receiver 511 and can provide the user with updates to the heat in the cooking chamber 150, time left to cook, and ability to trigger moisture control apparatus 200. One mobile device 512 can also be wirelessly connected to more than one receiver 511 for a user with more than one cooking device 100.

The moisture control apparatus 200 can be modular to allow users with longer or deeper cooking devices 100 to select the parts of the dispersal portion 400 that will offer their cooking device 100 full coverage. An embodiment of the present disclosure can have multiple dispersal portions 400 coupled to control portion 300. In this embodiment, the actuating valve can be connected to a tee connector 106 which can then be connected to two first conduits 101. This can allow larger cooking chambers 150 to still have full coverage without needing to change the misting of fogging nozzles 103 used in the system.

Water can enter the moisture control apparatus 200 from a water source connected to the straight adapter 107. The water can fill the control portion 300 of the moisture control apparatus 200. The pressure gauge 108 can read and display the water pressure present in the control portion 300. When instructed, via pushing a physical actuator or via signal using a digital system, the controller 111 can actuate the control valve to transition to an open position allowing the water to travel to the dispersal portion 400. In the dispersal portion 400 the water can travel through the conduits and be expelled through the one or more misting or fogging nozzles 103. When the amount of moisture desired has been expelled into the cooking chamber 150, the controller 311 can be actuated again to transition to the closed position cutting the supply of water to the dispersal portion 400.

Figure 7:
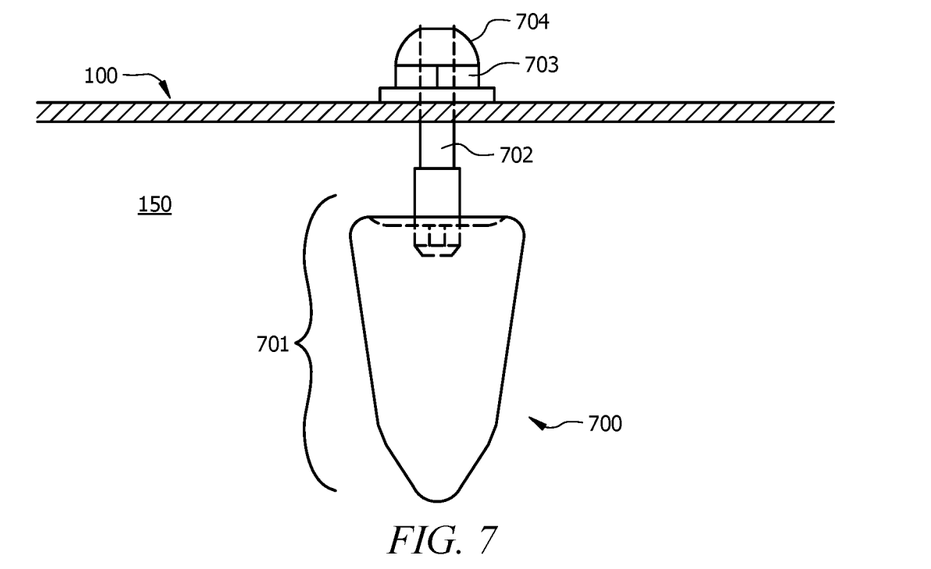
FIG. 7 depicts side view of a hanger for supporting the dispersal portion of the moisture control apparatus according to the disclosure.

FIG. 7 depicts a hanger 700 for supporting the dispersal portion 400 of the cooking system 10 according to the disclosure. The hanger 700 can be used to support the weight of the dispersal portion 400. The hanger 700 can have a loop 701, a rod 702, a nut 703, and a cap 704. The loop 701 can be wider at the base and narrower at the tip. The loop 701 can be made of metal, or other materials that can withstand the heat in the cooking chamber 150 of the cooking device 100. The loop 701 can accept the first conduit 101 or an additional conduit 104, or in other embodiments can accept a stabilizing strut 112. The rod 702 can be attached to the loop 701 and can extend through a wall or ceiling of the cooking chamber 150 of the cooking device 100. The nut 703 and the cap 704 can be attached to the end of the rod 702 that is on the exterior of the wall of the cooking device 100, securing the hanger 700 in place.

Figure 8:
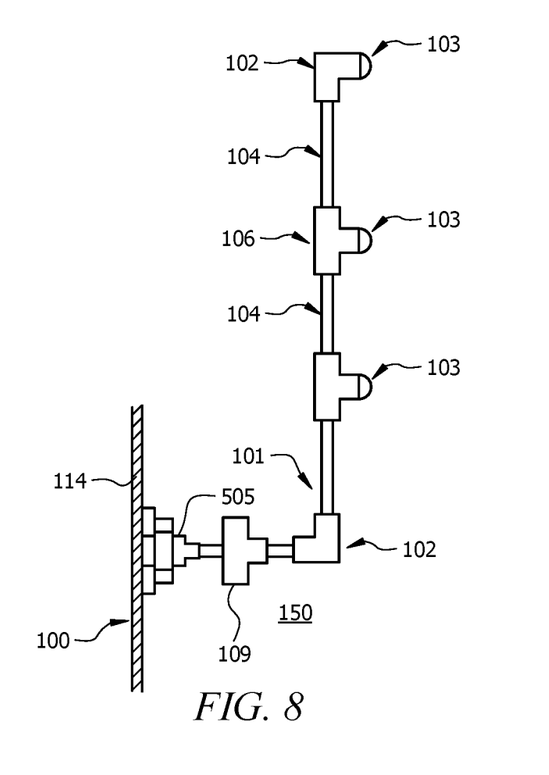
FIG. 8 depicts a side view of a vertically oriented dispersal portion of the moisture control apparatus according to the disclosure.

FIG. 8 depicts a vertically oriented dispersal portion 400 of moisture control apparatus 200 according to an embodiment of the disclosure. The vertically oriented dispersal portion 400 can be connected to an embodiment of the control portion 300 disclosed herein. Inside the cooking chamber 150, a conduit can pass through the through-wall connector 505 and connect to a straight connector 109. In previous embodiments the first conduit 101 would then be attached to the straight connector 109 to begin forming a horizontal dispersal portion 400. In the present embodiment, the straight connector 109 can have a conduit connecting to an elbow connector 102. The elbow connector 102 can then have the first conduit 101 attached. The first conduit 101 can be perpendicular to the conduit and the straight connector 109 creating a vertical dispersal portion 400. In some embodiments, the elbow connector 102 can be replaced with a tee connector 106. The first conduit 101 can be connected to the perpendicular opening of the tee connector 106 forming the vertical dispersal portion 400. An additional conduit 104 can be connected to the last opening of the tee connector 106 and extend the length of the cooking chamber 150. On the opposite side of the cooking chamber 150 the additional conduit 104 can be connected to an elbow connector 102. The elbow connector 102 can then have another additional conduit 104 attached to the other opening forming a second vertical dispersal portion 400 parallel to the first on the opposite side of the cooking chamber 150.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

What is claimed is:

1. A moisture control apparatus comprising:
a dispersal portion coupled to a wall of a cooking chamber of a cooking device and configured to provide a mist or fog of water particles to a cooking surface of the cooking chamber; and
a control portion coupled to the dispersal portion and configured to control a flow of water or a mixture containing water to the dispersal portion, wherein the control portion comprises:
a first control valve coupled to a conduit of the dispersal portion;
a controller operably connected to the first control valve, wherein the controller is configured to actuate the first control valve between an open position and a closed position so as to allow and disallow a flow of water from the control portion to the dispersal portion;
a housing that contains the first control valve and the controller;
an inlet connector connected to a wall of the housing and fluidly coupled to an inlet of the first control valve and contained in the housing;
an outlet connector connected to the wall of the housing and fluidly coupled to an outlet of the first control valve, wherein the outlet connector is fluidly coupled to a conduit of the dispersal portion; and
a relay electrically connected to the controller and to the first control valve, wherein the controller is configured to actuate the first control valve between the open position and the closed position via the relay.

2. The moisture control apparatus of claim 1, the dispersal portion comprising:
a conduit;
a connector attached to the conduit; and
a misting or fogging nozzle attached to the connector, wherein the misting or fogging nozzle is configured to disperse the water particles into the mist or fog.

3. The moisture control apparatus of claim 1, wherein the control portion is located outside the cooking chamber, wherein the dispersal portion is located inside the cooking chamber.

4. The moisture control apparatus of claim 1, wherein the controller comprises:
a button configured to mechanically or pneumatically actuate the first control valve between the open position and the closed position.

5. The moisture control apparatus of claim 1, wherein the controller comprises:
a wireless receiver configured to communicate with an application running on a mobile device and further configured to actuate the first control valve between the open position and the closed position based on one or more communications received from the application.

6. The moisture control apparatus of claim 1, wherein the control portion further comprises:
a liquid reservoir;
a pump having an inlet fluidly connected to the liquid reservoir;
a first check valve having an inlet fluidly coupled to an outlet of the pump and an outlet fluidly coupled to the inlet connector and to the inlet of the first control valve, wherein the first check valve is configured to disallow flow of liquid to the outlet of the pump; and
a second control valve having i) an inlet fluidly coupled to the outlet of the first control valve and to the outlet connector and ii) an outlet fluidly coupled to the liquid reservoir.

7. The moisture control apparatus of claim 6, wherein the relay is electrically connected to the pump and to the second control valve, wherein the controller is configured to actuate the second control valve between the open position and the closed position via the relay, wherein the controller is configured to turn the pump on and off via the relay.

8. The moisture control apparatus of claim 1, wherein the cooking device is a smoker, a pellet grill, a propane grill, or any other type of grill.

9. A cooking system comprising:
a cooking device having a cooking chamber; and
a moisture control apparatus comprising i) a dispersal portion coupled to a wall of the cooking chamber and containing within the cooking chamber, wherein the dispersal portion is configured to provide a mist or fog of water particles to a cooking surface of the cooking chamber, and ii) a control portion coupled to the dispersal portion and configured to control a flow of water or a mixture containing water to the dispersal portion,
wherein the control portion comprises:
a first control valve coupled to a conduit of the dispersal portion;
a controller operably connected to the first control valve, wherein the controller is configured to actuate the first control valve between an open position and a closed position so as to allow and disallow a flow of water from the control portion to the dispersal portion;
a housing that contains the first control valve and the controller;
an inlet connector connected to a wall of the housing and fluidly coupled to an inlet of the first control valve and contained in the housing;
an outlet connector connected to the wall of the housing and fluidly coupled to an outlet of the first control valve, wherein the outlet connector is fluidly coupled to a conduit of the dispersal portion; and
a relay electrically connected to the controller and to the first control valve, wherein the controller is configured to actuate the first control valve between the open position and the closed position via the relay.

10. The cooking system of claim 9, wherein the cooking device is a smoker, a pellet grill, a propane grill, or any other type of grill.

11. The cooking system of claim 9, the dispersal portion comprising:
a conduit;
a connector attached to the conduit; and
a misting or fogging nozzle attached to the connector, wherein the misting or fogging nozzle is configured to disperse the water particles into the mist or fog.

12. The cooking system of claim 9, wherein the control portion is located outside the cooking chamber, wherein the dispersal portion is located inside the cooking chamber.

13. The cooking system of claim 9, wherein the controller comprises:
a button configured to mechanically or pneumatically actuate the first control valve between the open position and the closed position.

14. The cooking system of claim 9, wherein the controller comprises:
- a wireless receiver configured to communicate with an application running on a mobile device and further configured to actuate the first control valve between the open position and the closed position based on one or more communications received from the application.

15. The cooking system of claim 9, wherein the control portion further comprises:
- a liquid reservoir;
- a pump having an inlet fluidly connected to the liquid reservoir;
- a first check valve having an inlet fluidly coupled to an outlet of the pump and an outlet fluidly coupled to the inlet connector and to the inlet of the first control valve, wherein the first check valve is configured to disallow flow of liquid to the outlet of the pump; and
- a second control valve having i) an inlet fluidly coupled to the outlet of the first control valve and to the outlet connector and ii) an outlet fluidly coupled to the liquid reservoir.

16. The cooking system of claim 15, wherein the relay is electrically connected to the pump and to the second control valve, wherein the controller is configured to actuate the second control valve between the open position and the closed position via the relay, wherein the controller is configured to turn the pump on and off via the relay.

17. The cooking system of claim 9, wherein the cooking device is a smoker, a pellet grill, a propane grill, or any other type of grill.

* * * * *